US012776020B2

(12) United States Patent
Decker et al.

(10) Patent No.: US 12,776,020 B2
(45) Date of Patent: Oct. 27, 2026

(54) MACHINE LEARNING MODEL FOR AUTOMATICALLY DETECTING FAULTS USING OPTICAL INSPECTION

(71) Applicant: Siemens Aktiengesellschaft, Munich (DE)

(72) Inventors: Thomas Decker, Unterschleißheim (DE); Michael Lebacher, Töging am Inn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 279 days.

(21) Appl. No.: 18/375,685

(22) Filed: Oct. 2, 2023

(65) Prior Publication Data

US 2024/0127418 A1 Apr. 18, 2024

(30) Foreign Application Priority Data

Oct. 5, 2022 (EP) .................................... 22199865

(51) Int. Cl.
*G06T 7/00* (2017.01)
*G06T 7/10* (2017.01)
*G06T 7/70* (2017.01)

(52) U.S. Cl.
CPC .............. *G06T 7/0004* (2013.01); *G06T 7/10* (2017.01); *G06T 7/70* (2017.01);
(Continued)

(58) Field of Classification Search
CPC ........... G06T 7/0004; G06T 7/10; G06T 7/70; G06T 2207/20081; G06T 2207/20084;
(Continued)

(56) References Cited

U.S. PATENT DOCUMENTS

2023/0316486 A1* 10/2023 Hicks, III et al. .... G06T 7/0004
2023/0367667 A1* 11/2023 Srivastava et al. ... G06F 11/079
(Continued)

FOREIGN PATENT DOCUMENTS

CN 110060237 B * 11/2021 ............... G06T 7/00
KR 20200046137 A 5/2020

OTHER PUBLICATIONS

An article entitled "Neural Decision Directed Segmentation of Silicon Defects", by Godbole et al., published in 2013 in The 2013 International Joint Conference on Neural Networks (IJCNN) (2013, pp. 1-8) (Year: 2013).*
(Continued)

*Primary Examiner* — Matthew C Bella
*Assistant Examiner* — Daniel Joseph Santos
(74) *Attorney, Agent, or Firm* — Schmeiser Olsen PLLC

(57) ABSTRACT

A computer-implemented method for generating a trained machine learning model for automatically detecting faults in a manufactured product using optical inspection is provided, including receiving a multitude of image data of images taken from manufactured products to be inspected, establishing a segmentation machine learning model which inputs
(Continued)

the image data of one image and out-puts a first number of image data segments, establishing a detection machine learning model including a separate detection machine learning model for each of the image data segments, combining each of the separate detection machine learning models with the segmentation machine learning model generating a paired machine learning model for each of the image data segments, coupling the paired machine learning models of all image data segments according to a fault criterion, and generating a trained machine learning model by optimizing the coupled paired machine learning models for all image data segments of the received images.

16 Claims, 3 Drawing Sheets

(52) U.S. Cl.
CPC ............... *G06T 2207/20081* (2013.01); *G06T 2207/20084* (2013.01); *G06T 2207/30128* (2013.01); *G06T 2207/30141* (2013.01)

(58) Field of Classification Search
CPC . G06T 2207/30128; G06T 2207/30141; G06T 2207/10024; G06T 2207/20112; G06T 7/001; G06T 7/0002; G06N 3/045; G06N 3/047; G06N 3/08; G06V 10/764; G06V 10/82; G01N 21/8851
USPC .......................................................... 382/141
See application file for complete search history.

(56) References Cited

U.S. PATENT DOCUMENTS

2024/0062356 A1* 2/2024 Xu et al. ............... G06T 7/0004
2024/0338559 A1* 10/2024 Zhang et al. ............ G06N 3/08
2025/0166169 A1* 5/2025 Govrin et al. .......... G06T 7/001
2025/0283832 A1* 9/2025 Zhou et al. ........ G01N 21/8851

OTHER PUBLICATIONS

Domen Tabernik et al: "Segmentation-Based Deep-Learning Approach for Surface-Defect Detection" arxiv.org, Cornell University Library, 201 Olin Library Cornell University Ithaca, NY 14853, Mar. 20, 2019 (Mar. 20, 2019), XP081370220, DOI: 10.1007/SI0845-019-01476-X * the whole document *.

Bozic Jakob et al: "End-to-end training of a two-stage neural network for defect detection" , 2020 25th International Conference on Pattern Recognition (ICPR), IEEE, Jan. 10, 2021 (Jan. 10, 2021), pp. 5619-5626, XP033909708, DOI: 10.1109/ICPR48806.2021.9412092 [retrieved on Apr. 22, 2021] * the whole document *.

Pahwa Ramanpreet Singh et al: "FaultNet: Faulty Rail-Valves Detection using Deep Learning and Computer Vision", 2019 IEEE Intelligent Transportation Systems Conference (ITSC), IEEE, Oct. 27, 2019 (Oct. 27, 2019), pp. 559-566, XP033668386, DOI: 10.1109/ITSC.2019.8917062 [retrieved on Nov. 27, 2019] * the whole document.

Jun Xiang et al: "Fabric defect detection based on a deep convolutional neural network using a two-stage strategy", Textile Research Journal, [Online] vol. 91, No. 1-2, Jun. 28, 2020 (Jun. 28, 2020), pp. 130-142, XP093000686, GB ISSN: 0040-5175, DOI: 10.1177/0040517520935984 Retrieved from the Internet URL:http://journals.sagepub.com/doi/full-xml/10.1177/0040517520935984> [retrieved on Nov. 22, 2022] * Section "Detection algorithm" *.

* cited by examiner

MACHINE LEARNING MODEL FOR AUTOMATICALLY DETECTING FAULTS USING OPTICAL INSPECTION

CROSS-REFERENCE TO RELATED APPLICATIONS

This application claims priority to EP Application No. 22199865.1, having a filing date of Oct. 5, 2022, the entire contents of which are hereby incorporated by reference.

FIELD OF TECHNOLOGY

The following relates to a computer-implemented method for generating a machine learning (ML) model for automatically detecting faults in a manufactured product using optical inspection and a method for detecting faults in a manufactured product applying the interpretable machine learning model.

BACKGROUND

Modern industrial production strongly relies on the usage of automatic optical inspection (AOI) devices for the detection of failures, such as missing components and quality failures such as misshapen, broken, or skewed components. Examples for their usage are the counting of salami slices on pizza in the foods and beverage industry, the correct position and/or broken connections of electronic parts on printed circuit boards (PCB) in electronics production, visual inspection of produced parts in the automotive industry, and furthermore.

AOI is a well settled technique that can work without the usage of Machine Learning. Examples are filters and rules applied to the input images that are sufficient, for simple problem, to detect quality errors on the PCB boards. A very common approach is reference comparison where a standard image, called template, is compared with the actual images. While this is simple, many issues, e.g., with respect to illumination or orientation of the image arise. Non-reference verification approaches and hybrid versions of reference and non-reference approaches exist but, e.g., PCBs are becoming more complex with ever smaller and more densely placed components. Hence, finding specialized filters or even handcrafted rules becomes increasingly complex.

Moreover, adaptation of an AOI system to modifications or even new types of boards typically requires redefining all filters and rules from scratch. This can be a very time-consuming process.

With the recent advances in Computer Vision and Deep Learning and especially the development of convolutional neural networks (CNNs) image recognition in all flavors has become much more feasible and applicable to all kinds of complicated problems. However, AOI Systems based on Machine Learning face some challenges too. Most importantly, the Machine Learning models employed in AOI devices are often notorious black box algorithms that do not reveal their inner working. This makes it very hard to comprehend the resulting decision, which is necessary to justify the decision, to correct it manually or to improve the ML model itself. In fact, AOI systems typically need to evaluate objects that contain many separated components all at once while each component may exhibit a variety of different fault characteristics. This further complicates the application of common machine learning algorithms and their interpretability.

AOI devices are often tuned to be very conservative, i.e., very often the AOI device wrongly sorts out good parts which strongly increases manual effort and in the worst case the scrap rate. Otherwise, if the AOI is not tuned to decide conservative one faces an even more severe issue by forwarding defect PCB boards to the production which results in products of low quality. Hence, understanding what went wrong with the decision of the AOI system is very important.

SUMMARY

An aspect relates to an automatic fault detection method using optical image recognition which is complex and flexible enough to capture diverse faults in manifold structured inspected products, and which is at the same time human interpretable, allows to incorporate domain knowledge and provides information about distinctive origins of anomalies.

A first aspect concerns a computer-implemented method for generating an interpretable machine learning model for automatically detecting faults in a manufactured product using optical inspection, comprising:

- receiving a multitude of image data of images taken from manufactured products to be inspected,
- establishing a segmentation machine learning model which inputs the image data of one image and outputs a first number of image data segments, each image data segment covering a coherent subset of image data,
- establishing a detection machine learning model comprising a separate detection machine learning model for each of the image data segments, wherein each of the separate detecting ML model inputs the image data of the image data segment and outputs a fault probability for the respective image data segment,
- combining each of the separate detecting machine learning models with the segmentation machine learning model generating a paired ML model for each of the image data segments,
- coupling the paired ML models of all image data segments according to a fault criterion, and
- generating a trained ML model by optimizing the coupled paired ML models for all image data segments of the received images.

The generated ML model provides not only a fault probability for the complete image but a segmentation of the image and for each of the segment the fault probability for depicting a fault. Thus, the output of the ML model is human interpretable in terms of the location of at least one fault, i.e., it provides distinctive origins of anomalies. The origin of anomalies can be easier verified at the inspected product, which provides more confidence in the generated ML model. The root-cause of the fault or anomaly can be identified easier, and product can be revised or redesigned based on the identified root-cause.

In an embodiment of the method, the first number of image data segments is predefined, based on domain knowledge.

This allows an easy and flexible adaption of the model to changing types of manufactured product, especially to changing structure of the product. E.g., for manufactured products like printed circuit boards PCB, the first number of image data segments can be defined according to the number of major components mounted on the PCB. This further reduces and optimizes the time for training the ML model for such a changed inspected product.

In an embodiment of the method, the trained ML model outputs an indication of a location for each of the determined image data segments related to the image of the manufactured product, and a fault probability for each determined image data segment and/or a fault value for the manufactured product as a whole.

The ML model itself determines the location and extend of the image data segments on the image in conjunction with the respective fault probability of each of the image data segments. The output of the location and spatial extend of the image data segments and the respective fault probability allows provide a map of the image with respect to segments of different fault probabilities guiding the user to root-causes of the fault. The output of the fault value for the manufactured product as a whole provides a measure severeness of the fault with respect to the functioning of the entire inspected product.

In an embodiment of the method, the fault criterion is an accumulated fault adding the fault probabilities across all image data segments.

This fault criterion allows that fault severity across components can add up. This can be helpful in situations where for instance a tiny scratch at one component can be tolerated and should not cause the model to discard the whole board.

In an embodiment of the method, the fault criterion is an exclusive fault, wherein the manufactured product is not faulty if none of the segments are faulty.

This fault criterion is useful when it is desirable to assure that a product is only classified as fault free if all individual components are undamaged.

In an embodiment of the method, the image data of the image contains labels indicating that the manufactured product as a whole is faulty, or that the manufactured product as a whole is not faulty.

The labels of the image data for training the ML model comprise only an indication referring to the entire manufactured product and therefore the time effort to attain labels is reduced. No labelling of the image data is required with respect to the image data segments of the image, i.e., the type or form of the segments.

In an embodiment of the method, the label indicates the type of fault of the manufactured product as a whole.

This enables the generated ML model to differentiate between different faults and to output the determined type of fault when applied to image data of actual inspected products.

In an embodiment of the method, each separate detection ML model is a neural network, which outputs a probability value based only on the image data of the image data segment determined by the segmentation ML model.

In an embodiment of the method, the segmentation ML model is a neural network, which outputs a random one hot vector containing a single value of one at a specific position and zeros everywhere else, wherein the position of the value of one follows a discrete distribution that is reparametrized to be continuous and differentiable.

The re-parametrization, e.g., by a Gumble-Softmax reparametrization, allows the joint optimization of the segmentation model together with the separate detection machine learning model using gradient-based optimization techniques and at the same time decoupling of the segments with respect to the optimization. Gradient based optimization has proved to be very effective for optimizing neural networks. Only by the re-parametrization of the segmentation ML model the use of gradient-based optimization is possible.

In an embodiment of the method, the manufactured product is a printed circuit board, a produced part in automotive industries or in food and beverage industry.

The generated ML model can be applied in a wide range of manufacturing for automatic optical inspection for quality inspection, production monitoring and anomaly detection.

A second aspect concerns a computer-implemented method for automatically detecting faults in a manufactured product using optical inspection, comprising:

receiving an image data of an image taken from a manufactured product to be inspected, inputting the image data into a trained ML model generated, outputting an indication of a location of the determined image data segments related to the image of the manufactured product, and outputting a fault probability for each determined image data segment, and/or outputting a fault value for the manufactured product.

A third aspect concerns a training apparatus for generating a trained ML model, comprising:

an input module, configured to receive a multitude of image data of images taken from manufactured products to be inspected, a segmentation module, configured to establish a segmentation machine learning model which inputs the image data of one image and outputs a first number of image data segments, each image data segment covering a coherent subset of image data, a detection module, configured to establish a detection machine learning model comprising a separate detection machine learning model for each of the image data segments, wherein each of the separate detecting ML model inputs the image data of the image data segment and outputs a fault probability for the respective image data segment, a combiner module, configured to combine each of the separate detecting machine learning models with the segmentation machine learning model (Ms) generating a paired ML model for each of the image data segments, a coupler module, configured to couple the paired ML models of all image data segments according to a fault criterion, and an optimization module, configured to generate a trained ML model by optimizing the coupled paired ML models for all image data segments of the received images.

A fourth aspect concerns a detection apparatus for automatically detecting faults in a manufactured product using optical inspection, comprising:

an input module, configured to receive an image data of an image taken from a manufactured product to be inspected, a detection module, configured to input the image data into a trained ML model generated, and an output module, configured to output an indication of a location of the determined image data segments related to the image of the manufactured product, and to output a fault probability for each determined image data segment, and/or to output a fault value for the manufactured product.

A fifth aspect concerns a computer program product (non-transitory computer readable storage medium having instructions, which when executed by a processor, perform actions) directly loadable into the internal memory of a digital computer, comprising software code portions for performing the steps of the computer-implemented method for generating a machine learning model for automatically detecting faults in a manufactured product using optical inspection, when the product is run on the digital computer.

A sixth aspect concerns a computer program product directly loadable into the internal memory of a digital computer, comprising software code portions for performing the steps of a computer-implemented method for automatically detecting faults using optical inspection, when the product is run on the digital computer.

BRIEF DESCRIPTION

Some of the embodiments will be described in detail, with reference to the following figures, wherein like designations denote like members, wherein:

FIG. 1 schematically illustrates an example of a manufactured product being evaluated by optical image inspection using the inventive computer-implemented methods;

FIG. 2 illustrates an embodiment of the inventive method for generating a trained machine learning model by a flow diagram;

FIG. 3 schematically illustrates an embodiment of the main steps of the method generating a trained machine learning model;

Figure 6:
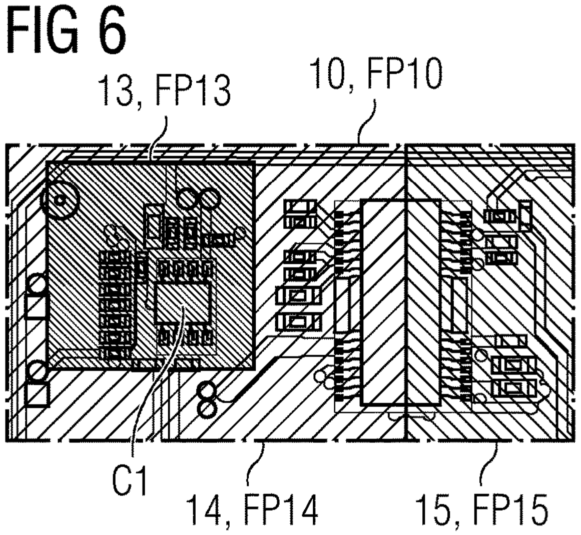
Figure 7:
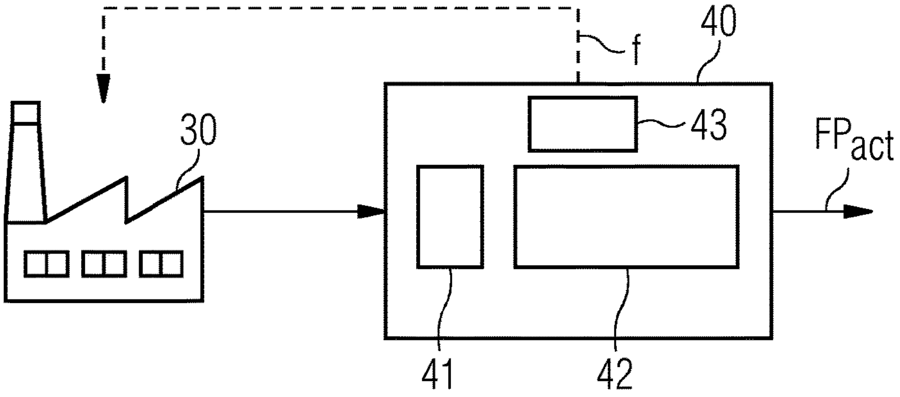

FIG. 6 schematically illustrates a further example of a manufactured product being evaluated by optical image inspection using the inventive computer-implemented method; and FIG. 7 illustrates an embodiment of the inventive detection apparatus in an industrial environment by a block diagram.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional units, modules, components or other physical or functional elements could also be implemented by a direct connection or an indirect connection coupling element, e.g., via one or more intermediate elements. A connection or a coupling of entities or components can for example be implemented by a wire-based, a wireless connection and/or a combination of a wire-based and a wireless connection. Functional modules can be implemented by dedicated hardware, e.g., processor, firmware or by software, and/or by a combination of dedicated hardware and firmware and software. It is further noted that each functional modules described for an apparatus can perform a functional step of the related method and vice versa.

The proposed methods comprise the generation of a trained ML model and the usage of the trained ML model for automatic optical inspection (AOI) of manufactured products especially for fault detection. The inspected products are, e.g., printed circuit boards, produced parts in automotive industries or in food and beverage industries. In the following, the method steps and apparatuses will be illustrated to detect faults on a manufactured PCB board. In the following the words “faults”, “defects”, “deficiency” and “anomaly” are synonymously used and describe, e.g., misplacement of components, deformed components, broken connections between components and furthermore.

Figure 1:
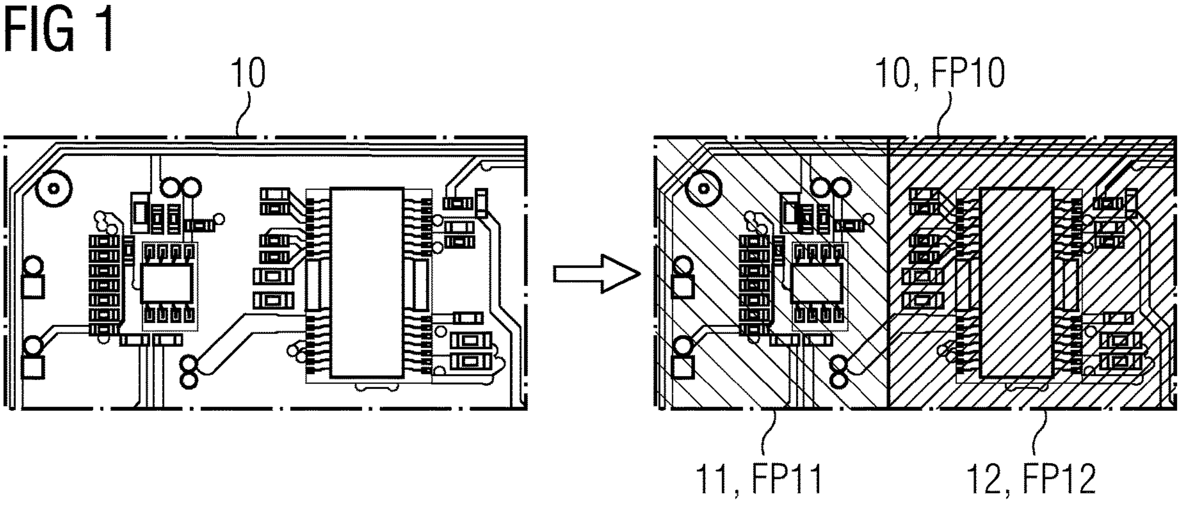

An example of such a manufactured PCB board 10 is depicted on the left side in FIG. 1. On the right-hand side an embodiment of an output of the trained ML model is shown when image data of the manufactured PCB board 10 is input into and processed by a trained ML model. Such output comprises an indication of a location for each of determined image data segments 11, 12 related to the image of the PCB board 10 and a fault probability FP11, FP 12 for each determined image data segment 11, 12. Additionally, a fault value FP10 for the entire manufactured product, i.e., the PCB board as a whole.

Note, however, that the technique itself is much more general and can be applied to any structured manufactured product.

Figure 2:
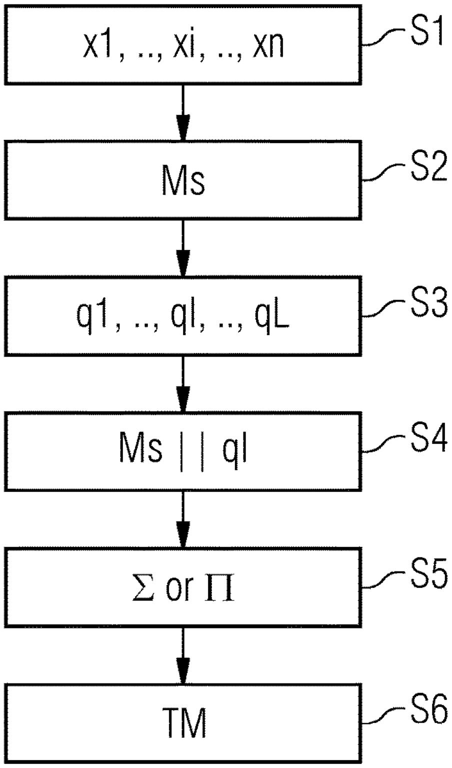

An embodiment of the steps of the method for generating such a trained machine learning model used for automatic fault detection of the manufactured product, here PCB boards, by optical inspection is described below and depicted in FIG. 2.

In a first step S1, a multitude of image data x1, . . . , xi, . . . , xn of a number of n separate images is received wherein each single image data x1, . . . , xi, . . . , xn comprises data of each pixel or a group of pixels of the image taken from the manufactured product to be inspected. A label y1, . . . , yi, . . . , yn is associated to each image data x1, . . . , xi, . . . , xn, wherein, e.g., each of the labels yi can be of value 1, 0, indicating that the manufactured product as a whole is faulty, i.e., yi=1, or that the manufactured product as a whole is not faulty i.e., y=0. The label relates to the entire image data of the manufactured product. The image data x1, . . . , xi, . . . , xn does not require labels with respect to the segmentation of the image data, i.e., it does not require any labels with respect to a number of segments, a location and/or spatial extension of the image data segments nor whether one or several of the image data segments is faulty or not faulty/fault-free.

In an embodiment the label of each of the image data x1, . . . , xi, . . . , xn comprises an indication of a type of fault shown at the image of the manufactured product, e.g., missing circuit chip, broken connection between components shown in the image data, e.g., electronic circuit components of a PCB board. Each of the labels yi can indicate one of K different fault type, i.e., yi=0, 1, 2, 3, . . . , K with 1, . . . , K indicating different fault types and 0 indicating no fault. In consequence, the model learns, that specific fault types occur only at specific segments. The resulting trained ML method outputs additionally a type of fault for the entire inspected product and/or the type of fault for at least one of the image data segments.

A segmentation machine learning model Ms is established, see S2, which inputs the image data xi of one image and outputs a first number of image data segments, each image data segment covering a coherent subset of image data xi. In an embodiment the first number of image data segments is predefined, based on domain knowledge. Domain knowledge is, e.g., the knowledge of the main circuit chips mounted on the PCB or the number of salami slices which shall be spread across a pizza produced in an industrial pizza production line.

Further on, a detection machine learning model is established comprising a separate detection machine learning model $q_1$ for each of the image data segments, wherein each of the separate detecting ML model $q_1$ inputs the image data of the image data segment xi and outputs a fault probability for the respective image data segment xi, see S3. Each of the separate detecting machine learning models $q_1$ is combined with the segmentation machine learning model (Ms) generating a paired ML model for each of the image data segments, see step S4. Each separate detection ML model $q_l$ outputs the probability value based only on the respective image data of the image data segment determined by the segmentation ML model. Such each of the combine models can be optimized independent for each of the segments.

The combined, i.e., paired ML models of all image data segments are coupled according to a fault criterion in the next step S5. One possible fault criterion is an accumulated fault adding the fault probabilities across all image data segments. A further fault criterion is providing an exclusive fault, wherein the manufactured product is not faulty if none of the segments are faulty. In a final step S6, the trained ML model TM is generated by optimizing the coupled paired ML models for all image data segments of the received images.

Figure 3:
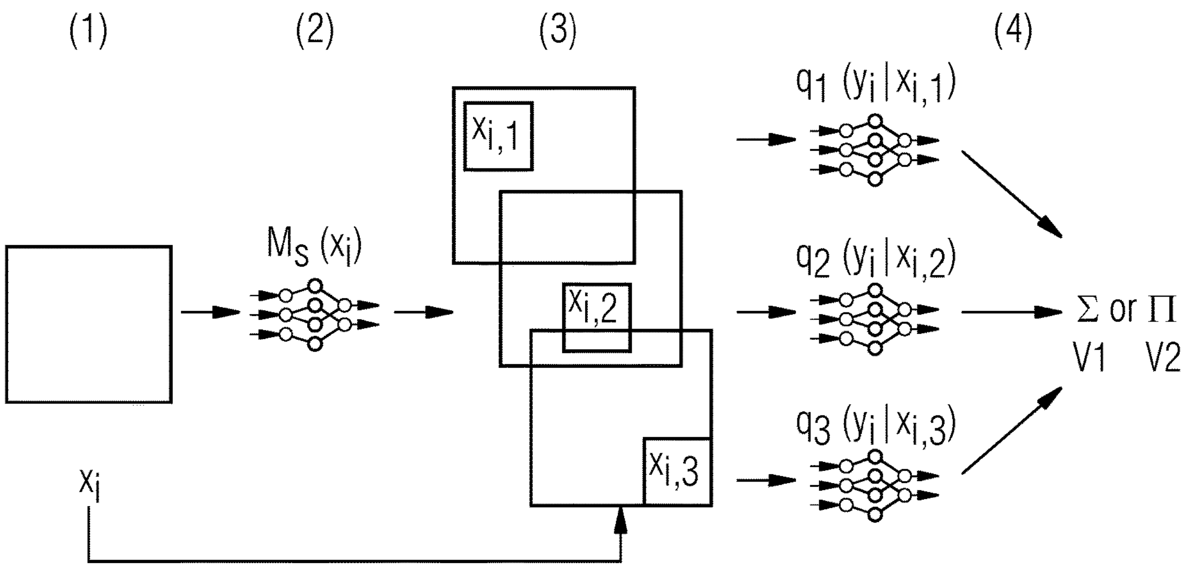

In the following, the steps of the method are formalized and described exemplary for detecting defect PCB boards. FIG. 3 shows a schematic representation of the main steps of the method.

Training Data $$D=(y_i,x_i),\ i=1, \ldots ,N,$$

received for training the ML model comprises a multitude of N image data $x_i$, and a label $y_i$ associated to each of the image data xi. The labels $y\in\{0,1\}$ indicate whether a PCB board is defect, noted by $y_i=1$, or not, noted by $y_i=0$. The image data xi represents an $(n_1\times n_2)$-dimensional matrix representation of grayscale image. I.e., $x_{i,p,q}$ with $p=1, \ldots, n_1$ and $q=1, \ldots, n_2$ ranges between 0 and 255. The images can also be color images represented by a $(n_1\times n_2\times 3)$-dimensional tensors with numeric representations or a color scheme of colors red, yellow, and blue. The formal task is to learn a function $$f(X_i)=P(Y_i=y_i|X_i x_i)$$

that is interpreted as the probability distribution for xi being either defect or not defect. FIG. 3 shows exemplary one image data $x_i$ schematically in part (1) as a square on the left.

The task of detecting faults on a manufactured product and especially on a PCB board can be subdivided into segments as not the whole image data may contribute to a defect but only subparts of the image data. Hence, as exemplarily shown in FIG. 1 right-hand side, the decision whether the PCB board is defective can be decomposed into two independent sub decisions based on whether each individual component, e.g., chip is defective. And since both components belong to different locations on the board, each sub decision can be made based on a smaller subset of the input image 10, which are image data segments 11, 12.

In a more abstract terms, this logic translates to:

$$P(Y_i=0\,|\,X_i=x_i)= P\Big(\max_{l=1,\ldots,L} Y_{i,l}=0\,|\,X_i=x_i\Big)=P(\cap_{l=1,\ldots L} Y_{i,l}=0\,|\,X_i=x_i)= \prod_{l=1,\ldots,L} P_l(Y_{i,l}=y_{i,l}\,|\,X_i=x_i)=\prod_{l=1,\ldots,L} P_l(Y_{i,l}=y_{i,l}\,|\,X_{i,l}=x_{i,l})$$

where $y_{i,l}$ denotes a prediction based on the input image segment $x_i$. Each $P_l$ can easily be parametrized as simple separate machine learning model $q_l$ and its parameters can be inferred from training data.

Hence, the image of the PCB board should be segmented for decisions based upon the individual segments $x_{i,l}$, that contain, e.g., separate structures like one major component and its peripheral components, see a schematic representation of $x_{i,l}$ in section (3) of FIG. 3. Hence, a detection ML model is proposed that incorporates this logic, i.e., segmentation in two alternative setups of the model:

$$P(Y_i=y_i\,|\,X_i=x_i)=\frac{1}{Z}\prod_{l=1,\ldots,L} q_l(Y_i=y_1\,|\,X_{i,l}=x_{i,l}) \tag{V1}$$

or alternatively $$P(Y_i=y_i\,|\,X_i=x_i)=\frac{1}{Z}\sum_{l=1,\ldots,L} q_l(Y_i=y_1\,|\,X_{i,l}=x_{i,j}) \tag{V2}$$

wherein L is the number of segments of the image, wherein an image data segment $x_{i,l}$ comprises all data points of the respective segment 1 of the image data $x_i$ and $q_l$ are separate detection ML models for each of the segments of the image.

Both detection ML models (V1), (V2) follow a similar idea, but represent different fault criteria for the board as a whole. The detection ML models are represented in part (4) on the right of FIG. 3. In detection ML model (V1) it is assumed that the distribution P(Y_i=y_i|X_i=x_i) can be decomposed into L conditional independent components $q_l$ while (V2) assumes that the individual components $q_l$ attribute additively. To ensure the outcome to be a valid probability distribution, both models come with a normalization constant Z.

In the detection ML model according to option (V1) the individual components $q_l$ are coupled by an exclusive fault criterion that assures that a board is only classified as fault free if all individual components are undamaged. This corresponds to the multiplicative connection of the expert models $q_l$ resembling a logical AND connection. In this case the separate detection ML model $q_l$ models the probability that segment 1 is undamaged, and an entire board is undamaged if all components are undamaged.

The detection ML model according to option (V2) represents an accumulative fault criterion that allows that fault severity across components can add up. This can be applied in a situation where for instance a tiny scratch at one component can be tolerated and should not cause the trained ML model to discard the whole board. But multiple tiny scratches shall be able to accumulate causing the trained ML model to output the entire board as faulty if enough scratches at different components are present. In that case the separate detection ML mode $q_l$ specifies the probability that segment 1 contains a damage.

If the locations of distinguishable components on the PCB board are known, this domain knowledge could be directly used to boost the performance of the algorithm. But this might not always be the case, especially since the PCB board design might change or different boards should be evaluated by the same model. In order to solve this issue, the structured detection ML model approach for detecting an anomaly is combined with a segmentation ML model, i.e., a second neural network trained to identify distinctive spatial locations containing distinctive components.

More specifically, given a desired number of segments L, one can define a segmentation model $M_S(X)$ that allocates each input pixel, i.e., each image data point, to exactly one segment, see section (2) of FIG. 3. So, in mathematical term, $$M_S: \mathbb{R}^{n1 \times n2} \rightarrow \{0,1\}^{n1 \times n2 \times L}$$

where $M_S(x_i)_{p,q,l}=1$ means that pixel $x_{i,p,q}$ of the image matrix $x_i$ should belong to segment 1. Afterwards, all pixels allocated to the same segment by M_S can be forwarded to a separate sub model q_i for evaluation. To be able to learn such a neural network, it has to be ensured that the entire setup is differentiable and the discrete allocation to L different segments might be problematic.

To overcome this issue, each pixel allocation M_S (X)_ (p,q) is considered as a L-dimensional random one hot vector. This corresponds to a vector containing a single 1 at a specific position and zeros everywhere else where the position of the 1 follows a certain discrete distribution g. As discrete one hot distribution over {1, . . . ,L},g is entirely determined by specifying all probabilities $g_l=P(M_S(x_i)_{p,q,i}=1$. The task of $M_X$ can be reformulated in learning for each input pixel a probability of belonging to a certain image data segment.

Moreover, using the Gumble-Softmax re-parametrization this discrete one hot distribution can be relaxed to be continuous and reparametrized in terms of a simple Gumble (0,1) sample. The application of this computational trick finally enables a differentiable segment allocation procedure needed to formulate and learn it as a neural network. It is noted, that for the segmentation ML model $M_S(X)$ is trained jointly with the separate detection ML models for the segments and the training data D does not require any labels associated to the image data segments. It is not required for the training data to contain information on the segment in which a defect is located.

All parameters of this new model, which is combining each of the separate detection ML models $q_l$ with the segmentation ML model Ms and coupling each of the paired of each of the paired ML models, can be learned in concert, end-to-end from sufficient training data D, in terms of $$\min_{\theta_S,\{\theta_l\}_{l=1,\ldots,L}} \sum_{i=1}^{N} \text{Loss}\left(y_i, \frac{1}{Z}\prod_{l=1}^{L} q_l\left(M_s(x_i;\theta_s)_{:,:,l} * x_i;\theta_l\right)\right)$$

where $\text{Loss}(.,.;\theta_1)$ describes, for instance, the cross-entropy loss. Note, due to the specific design of the model, the entire setup is differentiable. This ensures that gradient-based optimization methods can be applied to find good parameters, which is the most common technique to train deep neural networks. Also note, that the first number of segments L is a hyperparameter that needs to be specified in advance by the user. However, this is not too critical since there could also be segment models $q_l$ that do not get any input allocated to by the segmentation model.

In an embodiment, each separate detection ML model $q_l$ is a deep neural network. By specifying each expert model $q_l$ as a deep neural network, the flexibility and expressivity is provided which is needed to computationally solve the underlying task. However, structuring the ML model into simpler local models facilitates training the ML model compared training a single extensive model that is be capable to identify all potential fault characteristics from all different parts all at once. In this way it is easier for deep neural networks to learn.

Moreover, by evaluating the separate detection models $q_l$, it is already known which part of the PCB board caused an error. This increases the transparency and interpretability of the ML model significantly. In consequence, only the relevant segment of the board, i.e., the segment comprising the defect component needs to be inspected manually, saving time and resources for the customer. Additionally, if the location of distinctive components on a board is fixed and known, the respective separate detection model $q_l$ can be fixed looking only at that location, i.e., inputting only pixel of the respective image data segment. If only partial component locations are known, a mixed trained ML model can be established comprising fixed segments where component locations are known while for the rest of the board, optimal component distinction is learned automatically via the segmentation ML model Ms. Thus, any amount of available domain knowledge about the location of components can directly be uses to boost the performance of the trained ML model. Alternatively, even if information about distinguishable components is known the trained ML model can be configured to find all distinctive segments in concert with their evaluation. This makes model adaptation and set up very simple.

Figure 4:
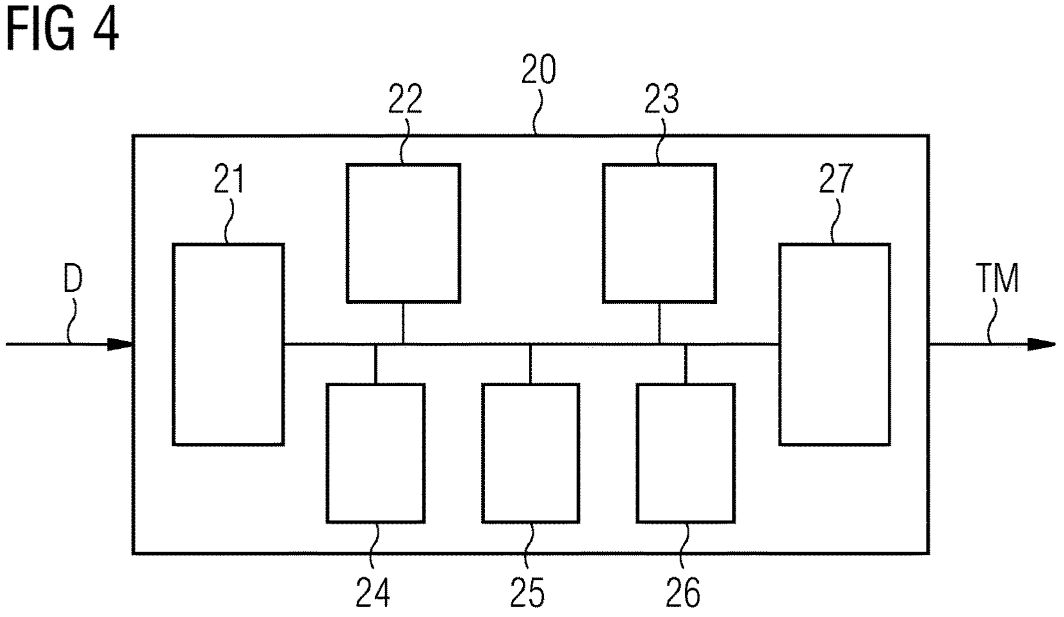
FIG. 4 illustrates an embodiment of the inventive training apparatus by a block diagram.

An embodiment of a training apparatus 20 is shown in FIG. 4. The training apparatus 20 comprises an input module 21 configured to receive training data D, i.e., a multitude of image data xi of images taken from manufactured products to be inspected and a label assigned to each image data xi of one image indicating whether the image shows a faulty or not faulty manufactured product.

The training apparatus 20 comprises a segmentation module 22, configured to establish a segmentation machine learning model Ms which inputs the image data of one image and outputs a first number of image data segments, each image data segment covering a coherent subset of image data. The training apparatus 20 comprises a detection module, configured to establish a detection machine learning model P comprising a separate detection machine learning model $q_l$ for each of the image data segments, wherein each of the separate detecting model $q_l$ inputs the image data of the image data segment and outputs a fault probability FP for the respective image data segment. The training apparatus 20 comprises a combiner module (24), configured to combine each of the separate detecting machine learning models $q_l$ with the segmentation machine learning model Ms generating a paired ML model for each of the image data segments. A coupler module 25 of the training apparatus 20 is configured to couple the paired ML models of all image data segments according to a fault criterion. The training apparatus 20 comprises an optimization module 26, configured to generate a trained ML model by optimizing the coupled paired ML models for all image data segments of the received images.

The training apparatus 20 comprises an output module 27 configured to output the trained ML model, comprising the trained detection model P and the trained segmentation model Ms. The trained segmentation model Ms decomposes single image data into image data segments. The trained detection model P comprises separate detection ML models $q_l$ parametrized according to the training data. The separate ML models $q_l$ receives as input the image data segment which was output by the segmentation ML model Ms for the respective segment of the image. As result the separate ML models $q_l$ output a fault probability value indicating whether a faulty component is located in the respective segment.

Additionally, a fault value is output indicating either a binary value for a faulty or not faulty for the manufactured product as a whole or a probability value. In some embodiments, the output module comprises a display to visualize the segmentation provided by the segmentation ML model Ms. The training value 20 comprises in addition a user interface configured to receive input from a user, e.g., the first number L of segments.

Figure 5:
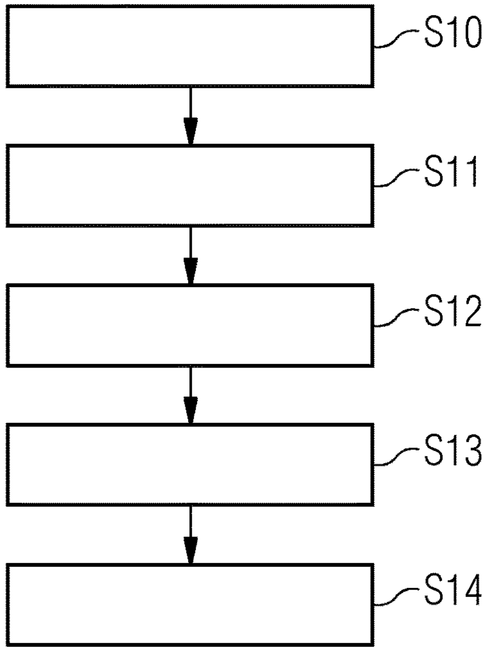
FIG. 5 illustrates an embodiment of the inventive method for detecting faults in a manufactured product by a flow diagram.

Once the trained ML model is fitted to training data of the manufactured product which shall be inspected, it can be applied to search for anomalies in new and previously unseen instances or the manufactured product. A computer-implemented method for automatically detecting faults in a manufactured product using optical inspection is depicted in FIG. 5.

In a first step S10 image data of an image is received which was taken from the actual instance of the manufactured product to be inspected. The image data is input into a trained ML model generated according to the method for generating the trained ML as described above, see step S11. In the next step S12, an indication of a location of the at least one determined image data segment is output. Additionally, a fault probability for each determined image data segment is output, see step S13 and/or a fault value for the manufactured product output, see step S14.

The output of the trained ML is intrinsically interpretable. As an example, the simple two components PCB is considered as shown in FIG. 1 and it is supposed that there exists a defect at one of the pins belonging to the left component C1, see FIG. 6. The trained ML model indicates for the PCB board as a whole, that there is a defect present when evaluating the image data of PCB board 10. The great advantage of the trained ML model is that its structure can be used to understand how the ML model forms its decisions. First, we can start by evaluating the output the segmentation model Ms. If the first number of segments L was input to be L=3 assuming three separate components of the PCB board 10, the output of the trained ML model P, Ms might look as indicated in FIG. 6 on the right-hand side. Although the number of segments did not match the number of distinctive components perfectly, it could be concluded that the trained ML model has learn a reasonable decomposition of the image data of the board 10 into image data segments 13, 14, 15. To further understand the output of the trained ML model that there is an fault in the PCB board 10 as a whole, the separate detection models $q_1$, $q_2$, $q_3$ can be considered which indicate a fault probability FP13, FP 14, FP15 that a defect exists in the segments 13, 14, 15. The segments 13, 14, 15 are represented by the subset of pixels $x_{i,1}$, $x_{i,2}$, $x_{i,3}$. The fault probability values FP13, FP 14, FP15 could look like:

$$q_1(x_{i,1})=0.01\ q_2(x_{i,2})=0.93\ q_3(x_{i,3})=0.002$$

From these fault probability values FP13, FP14, FP15 it can easily be inferred that the trained ML model labeled the board 10 to be defective because it has identified an anomaly in the image data segment 13. So, when this board 10 is forwarded to detailed inspection, only this segment 13 of the board 10 needs to be evaluated, e.g., by a domain expert and he would notice the defective pin.

An extension of the trained ML model to multiclass problems, i.e., $y_i$ taking more than two possible outcomes can be implemented effortlessly in this given algorithm.

FIG. 7 shows an embodiment of a detection apparatus 40 in an application environment of a manufacturing plant 30. Image data $x_{act}$ taken from an actually manufactured product is input into the detection apparatus 40. The detection apparatus comprises an input module 41, configured to receive an image data $x_{act}$ of an image taken from the manufactured product to be inspected. The detection apparatus 40 comprises a detection module 42, configured to input the image data $x_{act}$ into a trained ML model generated as described before. The detection apparatus 40 comprises an output module 43, configured to output an indication of a location of the determined image data segments related to the image of the manufactured product, and to output a fault probability $FP_{act}$ for each determined image data segments, and/or to output a fault value for the entire manufactured product.

In a further embodiment the training apparatus 20 and the detection apparatus 40 form a system for automatically detecting faults in a manufactured product using optical inspection. In such a system the train apparatus 20 and the detection apparatus 40 are implemented in a combined Hardware or implemented as two separate entities which are communicationally connected.

Conventional currently known models allocate entire image data to different expert models. Concerning the outlined case of PCB boards this would only mean that entire boards get judged by different models. This conventional approach does not reduce the complexity of the problem of detecting defects that may originate from a variety of different components on the board, and which additionally might exhibit very different characteristics. Also, if such models indicate a defect, it would still be unclear which component exactly caused this defect implying that there is no intrinsic interpretability.

In contrast, our proposed method decomposes each board into distinctive local components and each of those gets analyzed by a specialized model $q_l$. Hence, this framework accounts for the fact that single boards contain separate components, and it also enables to identify which component triggered the defect detection.

It is to be understood that the above description of examples is intended to be illustrative and that the illustrated components are susceptible to various modifications. For example, the illustrated concepts could be applied for different technical systems and especially for different subtypes of the respective technical system with only minor adaptions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating a trained machine learning model for automatically detecting faults in a manufactured product using optical inspection, comprising:

receiving a multitude of image data of images taken from manufactured products to be inspected;

establishing a segmentation machine learning model which inputs the image data of one image and outputs a first number of image data segments, each image data segment covering a coherent subset of image data;

establishing a detection machine learning model comprising a separate detection machine learning model for each of the image data segments, wherein each of the separate detecting machine learning models input the image data of the image data segment and outputs a fault probability for the respective image data segment;

combining each of the separate detection machine learning models with the segmentation machine learning model generating a paired machine learning model for each of the image data segments;

coupling the paired machine learning models of all image data segments according to a fault criterion; and generating the trained machine learning model by optimizing the coupled paired machine learning models for all image data segments of the received images.

2. The method according to claim 1, wherein the first number of image data segments is predefined, based on domain knowledge.

3. The method according to claim 1, wherein the trained machine learning model outputs:

an indication of a location for each of the first number of determined image data segments related to the image of the manufactured product, and a fault probability for each determined image data segment, and/or a fault value for the manufactured product as a whole.

4. The method according to claim 1, wherein the fault criterion is an accumulated fault adding the fault probabilities across all image data segments.

5. The method according to claim 1, wherein the fault criterion is an exclusive fault, wherein the manufactured product is not faulty if none of the image data segments are faulty.

6. The method according to claim 1, wherein a label is associated to the image data indicating that the manufactured product as a whole is faulty, or that the manufactured product as a whole is not faulty.

7. The method according to claim 6, wherein the label indicates a type of fault of the manufactured product as a whole.

8. The method according to claim 1, wherein each separate detection machine learning model is a neural network which outputs a probability value based only on the image data of the image data segment determined by the segmentation machine learning model.

9. The method according to claim 1, wherein the segmentation machine learning model is a neural network which outputs a random one hot vector containing a single value of one at a specific position and zeros everywhere else, wherein the position of the value of one follows a discrete distribution that is reparametrized to be continuous and differentiable.

10. The method according to claim 1, wherein the manufactured product is a printed circuit board, a produced part in automotive industries or in food and beverage industry.

11. A computer-implemented method for automatically detecting faults in a manufactured product using optical inspection, comprising:

receiving an image data of an image taken from a manufactured product to be inspected, inputting the image data into the trained machine learning model generated according to claim 1, outputting an indication of a location of the deter-mined image data segments related to the image of the manufactured product, and outputting a fault probability for each determined image data segment, and/or outputting a fault value for the manufactured product.

12. A detection apparatus for automatically detecting faults in a manufactured product using optical inspection, comprising:

an input module, configured to receive an image data of an image taken from a manufactured product to be inspected;

a detection module, configured to input the image data into a trained machine learning model generated according to claim 1; and an output module, configured to output an indication of a location of the determined image data segments related to the image of the manufactured product, and to output a fault probability for each of the first determined image data segments, and/or to output a fault value for the manufactured product.

13. A computer program product, comprising a computer readable hardware storage device having computer readable program code stored therein, said program code executable by a processor of a computer system to implement a method of claim 1 when the product is run on the digital computer.

14. The method according to claim 1, wherein labels associated with the image data comprise only an indication referring to the entire manufactured product as faulty or not faulty.

15. The computer program product directly loadable into the in-ternal memory of a digital computer, comprising software code portions for performing the steps of claim 11 when the product is run on the digital computer.

16. A training apparatus for generating a trained machine learning model, comprising:

an input module, configured to receive a multitude of image data of images taken from manufactured products to be inspected;

a segmentation module, configured to establish a segmentation machine learning model which inputs the image data of one image and outputs a first number of image data segments, each image data segment covering a coherent subset of image data;

a detection module, configured to establish a detection machine learning model comprising a separate detection machine learning model for each of the image data segments, wherein each of the separate detecting machine learning model inputs the image data of the image data segment and outputs a fault probability for the respective image data segment;

a combiner module, configured to combine each of the separate detecting machine learning models with the segmentation machine learning model generating a paired machine learning model for each of the image data segments;

a coupler module, configured to couple the paired machine learning models of all image data segments according to a fault criterion; and an optimization module, configured to generate a trained machine learning model by optimizing the coupled paired machine learning models for all image data segments of the received images.

* * * * *